United States Patent [19]

Valdez

[11] 4,188,808
[45] Feb. 19, 1980

[54] BICYCLE LOCK

[76] Inventor: Albert H. Valdez, 526 N. Kenwood, Apt. #6, Glendale, Calif. 91206

[21] Appl. No.: 851,474

[22] Filed: Nov. 14, 1977

Related U.S. Application Data

[63] Continuation-in-part of Ser. No. 756,814, Jan. 5, 1977, abandoned.

[51] Int. Cl.² ............................................. B62H 5/00
[52] U.S. Cl. .................................... 70/233; 70/38 A; 70/39; 70/49; 70/227
[58] Field of Search ..................... 70/30, 49, 38 A, 39, 70/225, 226, 227, 233, 234, 235, 236, 18, 26

[56] References Cited

U.S. PATENT DOCUMENTS

| | | | |
|---|---|---|---|
| 465,450 | 12/1891 | Brooke | 70/26 |
| 584,575 | 6/1897 | Cornell | 70/18 X |
| 596,237 | 12/1897 | Damon | 70/18 |
| 1,021,456 | 3/1912 | Evans | 70/26 |
| 1,402,725 | 1/1922 | Pippen | 70/227 |
| 1,594,586 | 8/1926 | Anderson | 70/18 |
| 1,638,264 | 8/1927 | Junkunc | 70/39 |
| 2,232,310 | 2/1941 | Boyler | 70/227 |
| 2,706,901 | 4/1955 | Jenkins | 70/227 |
| 3,756,008 | 9/1973 | Smith | 70/18 X |
| 3,950,972 | 4/1976 | Bleir et al. | 70/49 X |
| 3,965,709 | 6/1976 | Belke | 70/227 |
| 4,028,916 | 6/1977 | Pender | 70/49 X |
| 4,033,160 | 7/1977 | Mima | 70/49 X |

FOREIGN PATENT DOCUMENTS

| | | | |
|---|---|---|---|
| 352491 | 4/1922 | Fed. Rep. of Germany | 70/39 |
| 880789 | 5/1953 | Fed. Rep. of Germany | 70/49 |
| 2437501 | 2/1976 | Fed. Rep. of Germany | 70/39 |

*Primary Examiner*—Thomas J. Holko
*Attorney, Agent, or Firm*—John E. Wagner

[57] ABSTRACT

A bicycle lock mountable on the frame of a bicycle and including a body which stows a "U" or "J" shaped member and a cable or other flexible securing mechanism when not in use. Both are removable from the body with the "U" or "J" shaped member movable into a position encircling a rim of a wheel on the bicycle to prevent it from movement. The cable or the like is movable to encircle a support to which the bicycle may be locked. The cable terminates one end in the body of the lock and the other end in the "U" or "J" shaped member. An integral lock holds the "J" shaped member in fixed relationship with the body and covers or conceals the mechanism securing the body to the frame and bicycle. A retraction mechanism maintains the cable within the body except to the extend withdrawn for locking purposes. In alternate embodiments the cable encircles the lock body for storage. An integral mounting bracket is illustrated as well as a permanently mounted bracket used with a removable lock assembly.

13 Claims, 22 Drawing Figures

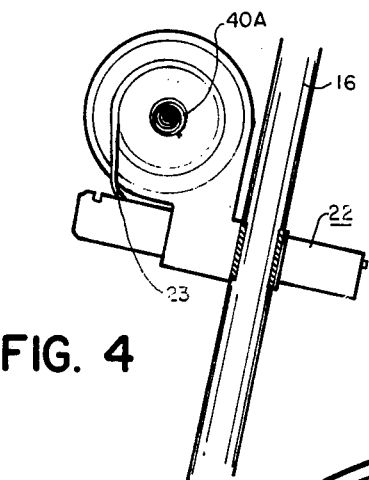
FIG. 4
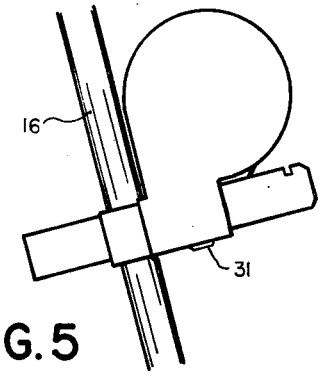
FIG. 5
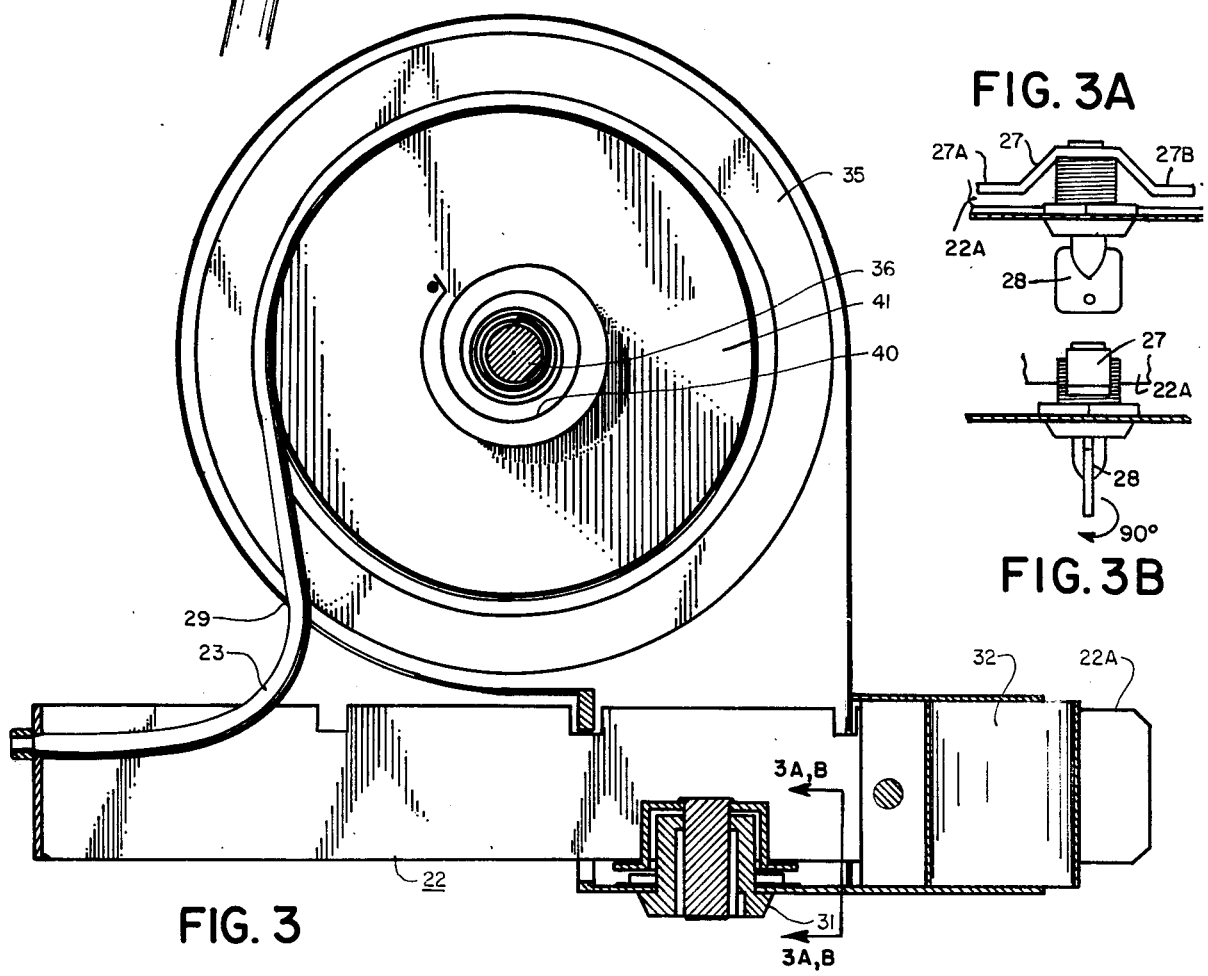
FIG. 3A
FIG. 3B
FIG. 3

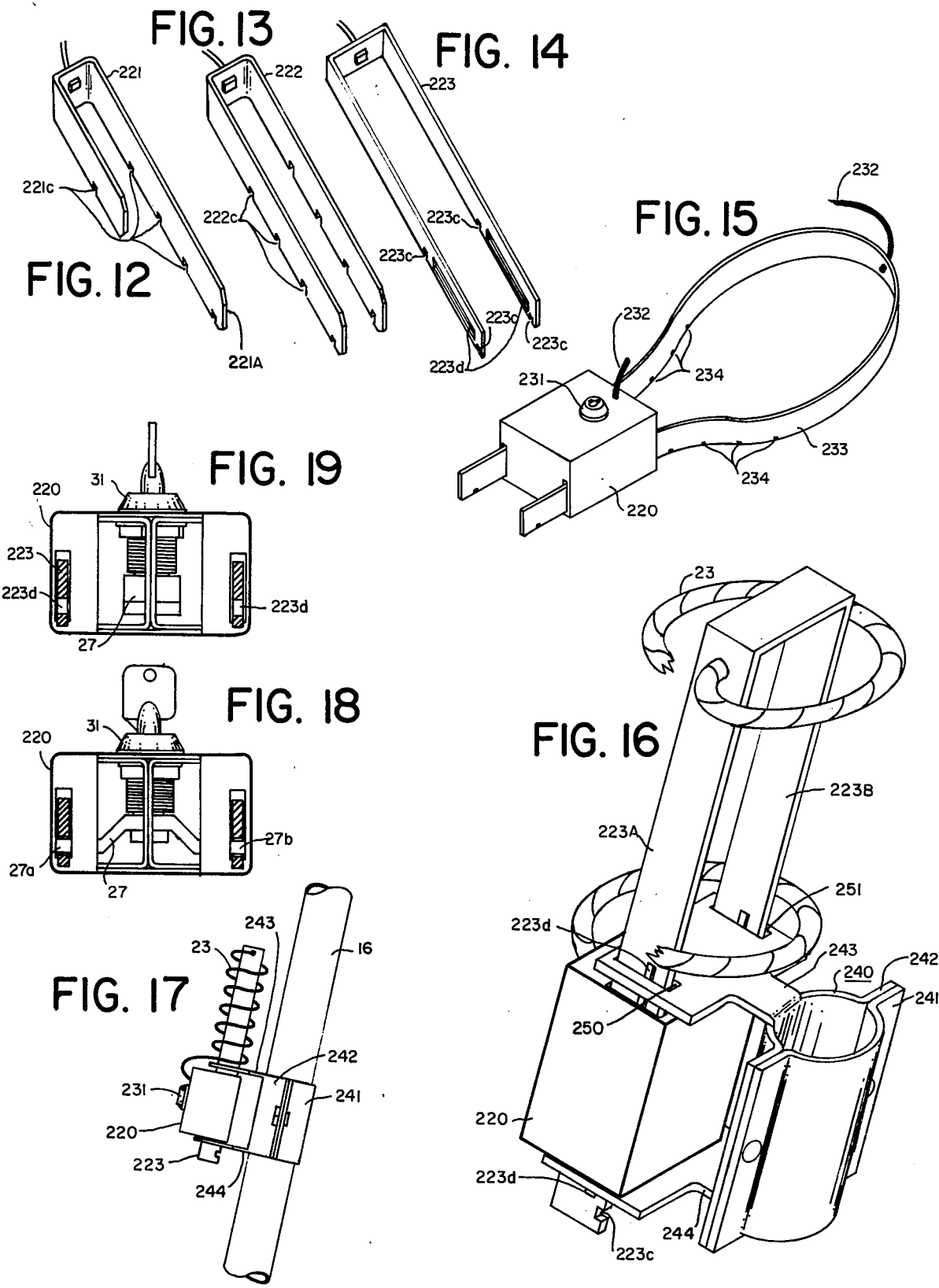

BICYCLE LOCK

REFERENCE TO RELATED PATENT APPLICATION

This application is a continuation-in-part of U.S. application, Ser. No. 756,814, filed Jan. 5, 1977, now abandoned.

BACKGROUND OF THE INVENTION

The development of locks for bicycles is nearly as old as the bicycle itself. U.S. Pat. No. 616,845 issued in 1898 shows a retractable locking mechanism which is pivotally secured to a frame of a bicycle and includes a flexible chain member movable to encircle the rim and tire of one wheel of the bicycle. When not in use, the lock mechanism is retracted by pivoting back between two frame members and out of use and out of the way.

U.S. Pat. No. 3,965,709 to Belke and U.S. Pat. No. 2,140,489 to Wise, show what are called "double acting locks", namely locks which obstruct the movement of a wheel and also provide a chain for securing the bike to a post. The older Wise patent puts an obstruction to the rotation of a wheel and also provides a chain to one side. The chain must be removed and separately stored when the bicycle is in use.

U.S. Pat. Nos. 1,504,220 to Degen and 3,832,871 to Kaufman both show devices which employ "J" shaped members as a part or as a principal locking element in a bicycle or automobile lock. The recent U.S. Pat. No. 3,950,972 to Bleier et al shows a bicycle lock with a retractable cable and a windup mechanism for retracting the cable into a housing when not in use. The cable may be made to encircle a wheel and a post as shown in FIG. 1 of that patent.

Additional prior art with which I am acquainted but which is not anticipatory are U.S. Pat. Nos. 584,575, 584,017, 596,237, 583,638, 1,402,725, 2,574,967, 2,232,310, and 2,706,901; German Pat. Nos. 352,491, 362,606, and 880,789; and French Pat. No. 866,462.

BRIEF STATEMENT OF THE INVENTION

With the foregoing statement of the art in mind, it is a general object of this invention to improve bicycle locks.

Another object of the invention is to provide a dual acting bicycle lock with integral storage for a flexible cable and convenient storage of the wheel locking member when not in use.

Another object of the invention is to provide a double acting lock in which either of the lock members may be used alone and which yet cooperate in providing maximum locking security.

One further object of the invention is to achieve a locking mechanism in which the lock members themselves obstruct unauthorized removal of the lock from the bicycle.

These objects are all achieved in accordance with this invention. One embodiment comprises a lock body including a tubular opening for receiving a frame member of a bicycle and a cylindrical cavity for storage of a wound flexible cable, as disclosed. A "U" or "J" shaped member including indexing or locking grooves in the legs thereof is arranged to be stored by insertion of the legs into mating openings in the lock body. A key lock mechanism is mounted in the body and positioned to engage the locking grooves in the "U" shaped member to hold it in stored position or selectively hold it with the base of the "U" encircling the tire and rim of a wheel, preferably the rear wheel of a bicycle. The "U" shaped member obstructs the access to the securing means for the lock body to the frame. A retractable cable is secured at one end of the lock body and the other end to the "U" shaped member. A retraction mechanism in the form of a retraction spring and drum is located within the cylindrical cavity of the lock body.

In another embodiment, a self recoiling cable is used and one side of the cylindrical cavity is open to allow automatic retraction of the cable into the cavity. When in a stored position, the "U" shaped member acts as a barrier to the retractable cable from falling out of the storage cavity.

In still another embodiment, the lock body is an elongated member having a major transverse dimension less than the natural internal diameter of a self coiling cable. In this embodiment, one end of the cable is secured to the body and the other to the "U" shaped member. When the "U" shaped member is stored, it holds the turns of the cable in place around the lock body.

In one further embodiment, the lock body does not include any mounting features but employs a superior slot locking arrangement between the wheel restraining member and the lock body.

BRIEF DESCRIPTION OF THE DRAWING

This invention may be more clearly understood from the following detailed description and by reference to the drawing in which:

FIG. 3 is a vertical elevational view through an alternate embodiment of this invention incorporating the lock in the bottom side thereof;

FIG. 3A is a fragmentary section view taken along line 3A—3A of FIG. 3 showing the lock detail in unlocking condition;

FIG. 3B is a fragmentary sectional view similar to the detail of FIG. 3A only in unlocked condition;

FIG. 4 is a vertical sectional view through another alternate embodiment of this invention employing self-recoiling cable;

FIG. 5 is the reverse side view of the embodiment of FIG. 4;

FIGS. 12–14 are perspective views of three alternate forms of locking bars for use in this invention;

FIG. 15 is a perspective view of a fourth alternate embodiment of this invention which is both removable from or storable on the bicycle and which employs a flexible wheel restrainer;

FIG. 16 is a perspective view of another alternate embodiment with its separate mounting bracket which is also useful for the embodiment of FIG. 15;

FIG. 17 is a side elevational view of the embodiment of FIG. 16 mounted on the frame of a bicycle;

FIG. 18 is a vertical sectional view through a typical lock body as illustrated in FIG. 16 showing the lock in locked condition; and FIG. 19 is a view similar to FIG. 18 only showing the lock in unlocked condition.

DETAILED DESCRIPTION OF THE INVENTION

Figure 1:
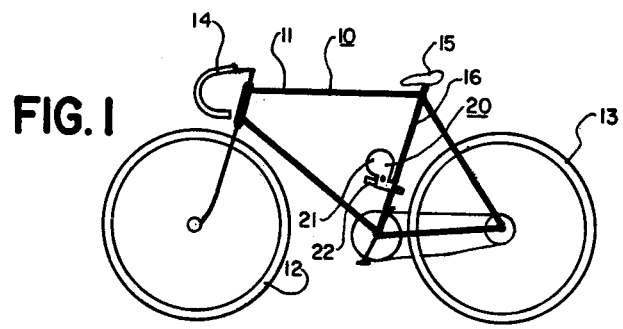
FIG. 1 is a side elevational view of a bicycle with the lock of this invention in stored condition.

Now referring to FIG. 1, a bicycle 10 seen therein including a frame 11, front and rear wheels 12 and 13, handle bars 14 and saddle 15. The frame 11 is a frame member 16 extending between the saddle 15 and the sprocket 17. This frame member 16 is adjacent to the rear wheel 13 and includes an unobstructed length which is generally at the mid-point of the bicycle and one which is normally unobstructed with brake or control cables and the like. Secured to the frame member 16 is a lock of this invention generally designated 20. It includes a lock body 21 and a locking bar member 22. Extending out of the lock body 21 is a cable 23 best seen in FIG. 2.

In FIG. 1, the lock 20 is shown in its stored postion within the frame 11 in front of frame member 16 and above sprocket 17. It is thus out of the way of all operating gear of the bicycle. It is in this position that the lock 20 remains while the bicycle is being ridden.

Figure 2:
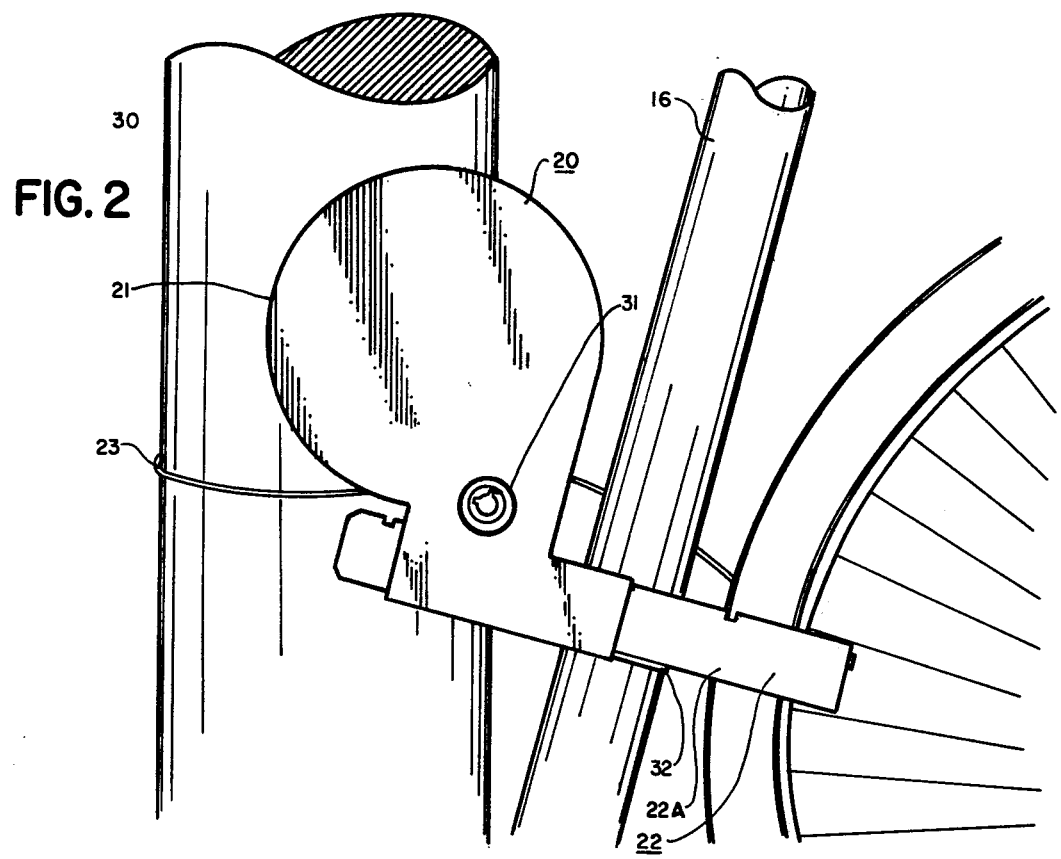
FIG. 2 is an enlarged fragmentary view of the lock of this invention in dual locking mode.
Figure 6:
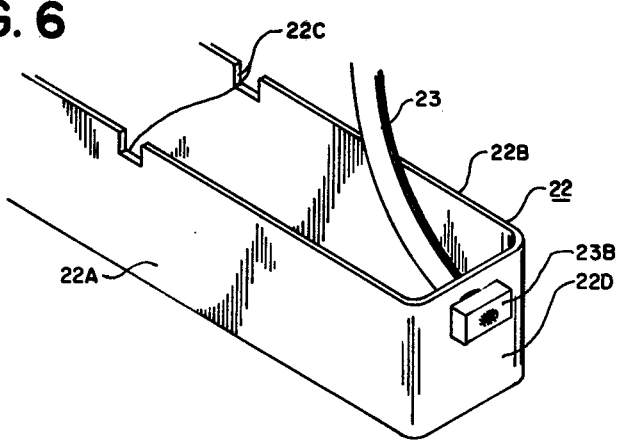
FIG. 6 is a view of the connection between the "U" shaped bracket and cable.
Figure 8:
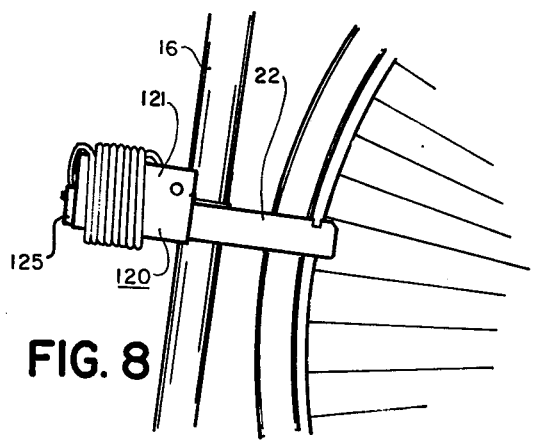
FIG. 8 is a side elevational view of another alternate embodiment of this invention in storage condition.
Figure 9:
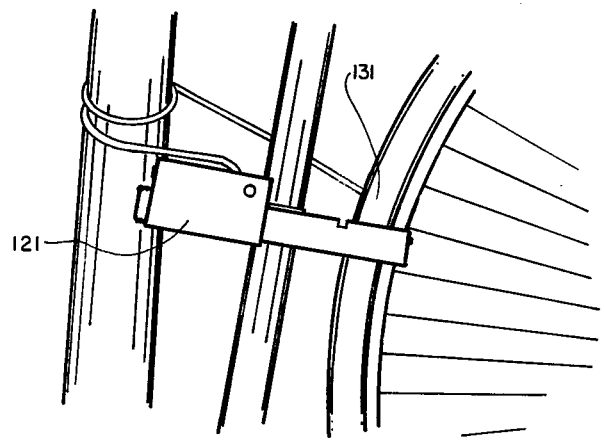
FIG. 9 is a side elevational view of the embodiment of FIG. 8 in locking position.
Figure 11:
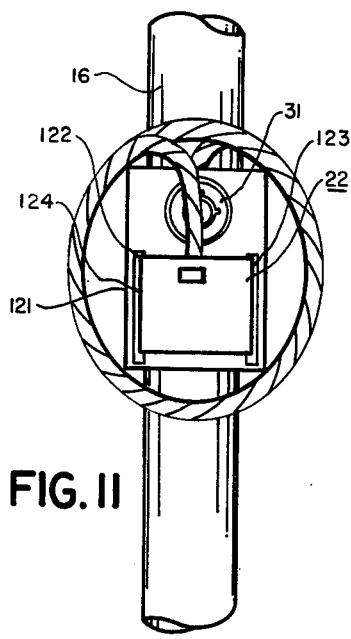
FIG. 11 is an end view of the embodiment of FIG. 8.

When the bicycle is locked in the dual mode, the lock assumes the position shown in FIG. 2. There, the locking bar member 22 has been withdrawn from the front of the lock body 21, drawing the cable with it around a convenient structure such as pillar 30. The locking bar 22 is of "J" or "U" shape as best seen in FIG. 6, and encircles the rear rim and tire 13. It is locked to the lock body 20 by key lock 31. The bar member 22 embraces not only the wheel 13 but the frame member 16 and prevents the wheel from both turning and being removed from the bicycle 10. The cable 23 prevents the bicycle from being removed from the pillar 30. The lock 20 is secured to the frame member 16 by encircling clamp 32 which is enclosed and protected from access by the legs 22A and 22B, the former of which appears in FIG. 2.

The cable is retracted by a conventional spring retraction system as seen in FIG. 3. This figure, showing an alternate embodiment, differs in the location of the key lock 31, namely on the bottom side of the housing. Other than this difference, FIG. 3 depicts in sectional form the lock 20 of FIG. 2. The cable is wound on a drum 35 within housing 21, rotates on shaft 36 and is retracted by helical spring 40 within the hub portion 41 of reel 35. Retractable spring assemblies of this type are available commercially from suppliers such as Sears Roebuck and Co., of Chicago, Illinois. The cable is preferably ¼ inch in diameter and 2 feet to 5 feet in length, depending upon the requirements of the user. The outermost end of the cable 23 passes through an opening in the base of the "U" or "J" shaped member 22 and is permanently secured thereto. Thus, the bar member 22 acts as a handle for withdrawing cable from the housing 20 through its opening 29. The cable 23 travels with the bar member 23 as it is reversed in direction and may, for example, pass through the front wheel 12 if no local structure such as pillar 30 of FIG. 2 is available.

The key lock 31 serves to hold the wheel restraining "J" or "U" shaped member in place by bearing against the underside of the legs of member 22 whereby two of its notches 22c engage the edge of the wall of housing 20 at points 20A and 20B which are the edges of the openings through which the legs 22A and 22B of the locking member 22 pass when it is either stored or in locking engagement.

The mode of locking is best illustrated in FIGS. 3A and 3B considered with FIG. 3. In FIG. 3, the member 22 is in locked condition as illustrated by the fact of engagement between the notches 22c and the walls 20A and 20B, and the fact that the member 22 is elevated above the bottom of the springs. This elevation and locking is produced by a locking modified T shaped member 27, best seen in FIG. 3A as having a pair of bearing surfaces 27A and 27B which bear upward against the lower edges of the locking member 22. This action is illustrated in FIG. 3B where the bearing surfaces 27A and 27B hold the legs 22A and 22B elevated while in FIG. 3A the member 27 is generally aligned with the legs 22A and 22B and thus allows the member 22 to freely move out of the housing 20. A 90 degree turn of key 28 from FIG. 3A to 3B produces locking of the member 22.

In the interest of simplicity, I have developed the alternate embodiment shown in FIGS. 4 and 5. In this embodiment, the retractable mechanism of FIG. 3 is eliminated since a self retracting cable 23a is used. This is a form of cable in which the strings have been prestressed into a helical shape, which the cable naturally assumes when not stretched. The housing 20 includes an annular side wall 28 defining a side opening exposing central hub 40a. When the locking bar 22 is removed from its stored position, it extends the cable 23 out of the side opening in housing 20. FIG. 5 shows the rear side of the embodiment of FIG. 4 presenting the same general appearance as the lock of FIGS. 1-3.

FIG. 6 shows the locking bar as removed from the lock body 20 carrying the end of cable 23 which is secured by an enlarged end 23B passing through an opening in the bight or end portion 22D. Note that the legs 22A and 22B each include edge slots 22C which engage the edge of the slots in the body 20 when locked. Engagement at both entrances of the lock body 20 adds to the security of the lock.

Figure 10:
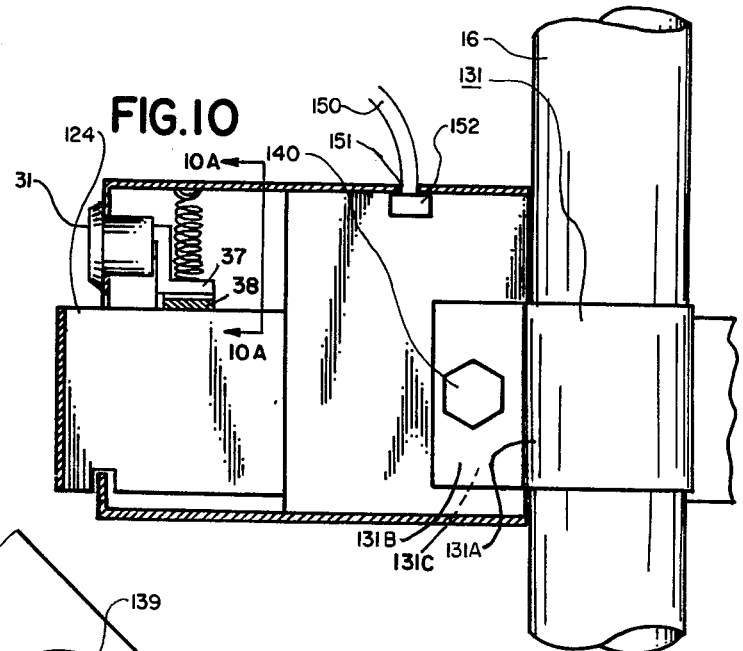
FIG. 10 is an enlarged fragmentary side view of the lock of FIG. 8.
Figure 7:
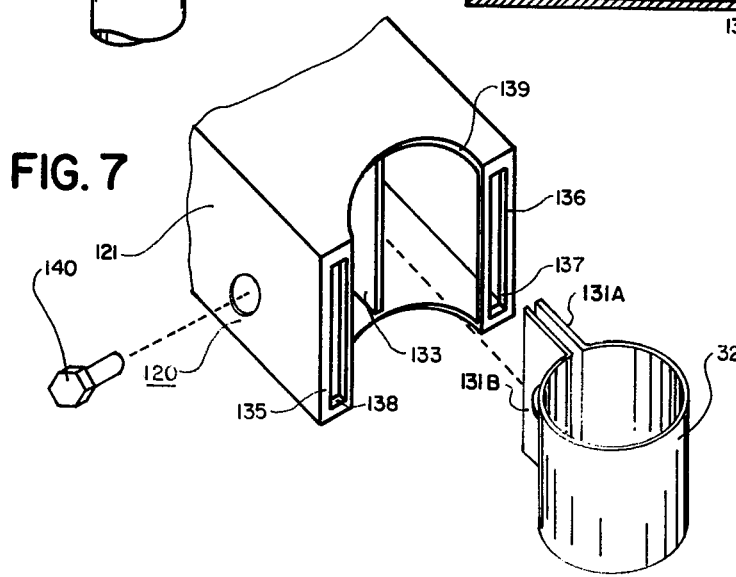
FIG. 7 is an exploded view of the mounting member for the locks shown in FIGS. 1–5 and 8–11.

Now referring to FIGS. 8-11, the details of an alternate embodiment of the bicycle lock may be more clearly seen. The lock 120 includes a lock body 121 in the form of an elongated box of preferably square section. The box 121 is closed at one end except for a pair of slots 122 and 123 appearing in FIG. 10 through which the legs 124 and 125 of locking member 126 may be inserted. The opposite end of the box 121 includes a recess of generally semi-circular shape defined by the upper and lower walls of box 120. The semi-circular recess receives the frame member 16 of the bicycle and cooperates with formed mounting strap 131 which holds the lock assembly to the frame member 16. The mounting strap 131 is separable from the body 121 and is so separated during the process of mounting on the frame member 16. The mounting strap 131 better seen in FIG. 10 includes not only the tubular section 131A but a pair of spaced flange members 131B and 131c, the last of which is on the reverse side and unshown in FIG. 10, one of which 131B is seen in FIG. 10 having an aperture therethrough for securement to the lock body by a screw 140. This mounting is accomplished by cooperation of the flange members 131B and C with an internal web 133 in the box 121 preferably extending between the top and bottom walls thereof. The rear of the box 120 adjacent to the frame member 16 is partially closed by the pair of partial walls 135 and 136, each of which include slots 137 and 138 comparable to the slots of the front walls and again adapted to receive the legs 124 and 125 of the locking bar when it passes through the box 120.

One end of a cable 150 or other flexible restraining device is secured within the box 120 and extends out of an opening in the upper wall of box 120 with the end of cable 150, secured within the box by enlarged end 152. In this embodiment, the opening 151 is shown in the upper wall. The cable is preferably prestressed into a helical spring form of low spring constant which may be stretched by light tension applied by the user. When stored, the cable assumes a natural helical shape about the periphery of the box 120. The opposite end of the cable 150 is secured to the locking bar 22. As shown in this embodiment, the cable terminates at the bight portion of a U shaped locking bar 22.

Figure 10A:
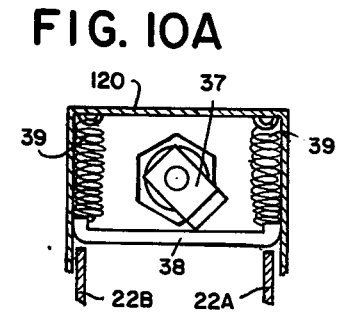
FIG. 10A is a fragmentary sectional view of the locking mechanism of FIG. 10 taken along lines 10A—10A of FIG. 10 when the lock is in an unlocked condition.

In the embodiment of FIGS. 8-11, the lock 31 is located in the end wall of the box 120 for convenience and accessability. The lock 31 includes an L shaped operator arm 37 which bears against a spring loaded U shaped locking bar 38. The locking bar is supported by a pair of springs 39 secured to the inner side of the top wall of box 120 and to the locking bar 38. The springs maintain the bar 38 free of the wheel restraining member 22 when the operator arm 37 is as shown in FIG. 10A. Thus, a 90 degree turn of lock 31 allows the locking bar 38 to move from an unlocked to locked position.

Now referring to FIGS. 12-14, three forms of wheel restraining member 22 may be seen, specifically, a "J" shaped member 221, a "U" shaped member 222, and a slotted "U" shaped member 223.

The "J" shaped member requires approximately twenty-five percent less metal to produce and for light duty service, is adequate. The single lead end 221A also makes insertion of the member 221 slightly easier than the "U" shaped member 222 of FIG. 13. The member 221 has only 3 operative locking slots 221c while the "U" shaped member 222 of FIG. 13 has four locking slots 222c at all positions of use for greater security.

For maximum security, I have found that the slotted "U" shaped member 223 is preferred. In addition to the edge slots 222c, it includes a pair of closed end elongated slots 223d.

Referring now to FIG. 15 in which a modification of this invention may be seen as including a lock body 220 having a lock 231 in one surface and a flexible cable 232 with one end secured within the body 220 and the opposite end secured to a flexible strap 233 having a number of edge slots 234. The strap preferably is of stainless steel or similar high strength yet flexible proterties to allow it to be flexed around a larger tire than the rigid brackets of FIGS. 12-14. This embodiment may be used for motorcycles, mopeds, golf carts, go-carts and the like. The cable may be used to encircle any nearby structure just as in the case of the previous embodiments.

The lock of FIG. 15 is distinct also in that it does not include an integral mounting device as in each of the embodiments described above. The device is therefore totally portable. It may be carried on a bicycle or other vehicle employing a bracket 240 as shown in FIGS. 16 and 17. The bracket 240 of FIG. 16 includes a semi-tubular back plate 241 and a front plate 242 forming a mating semi-cylindrical opening. The front plate 242 includes a pair of integral arms 243 and 244 spaced apart sufficiently to receive the lock body 220 with its slots for receiving a locking member 221-223 or strap 233. The arms 243 and 244 of bracket 240 include slots 250, 251 and two others not shown through which the arms 223A and 223B pass. As shown in FIG. 17, the bracket 240 engages a frame 16 and provides storage for the lock in an out of the way place when not in use. As so arranged, the cable acts as a shock mount for the lock by resting on the top of arm 243.

In each of the embodiments of this invention, the locking member 22 may be of the preferred version as shown in FIG. 14 as including closed end slots 223d. This provides more positive locking since the lock mechanism, particularly the arm 27 of FIG. 3 passes through the member 22 and not merely on top of it.

This is illustrated in FIGS. 18 and 19 which show in FIG. 18 the arms 27a and b extending into the slots 223d of the locking bar 223. This locking engagement prevents the removal of the bar 223 in addition to the locking engagement between the slots 223d and the edges of the openings in the lock body 220. Because of this additional securement, this is the preferred form of locking member 22.

The above described embodiments of this invention are merely descriptive of its principles and are not to be considered limiting. The scope of the invention instead shall be determined from the scope of the following claims including their equivalents.

What is claimed is:

1. A bicycle lock comprising a lock body means for securing the lock body to the frame of the bicycle;
   a "U" shaped member including a pair of legs of sufficient length to embrace a wheel of the bicycle and portions of the frame thereof and to extend into locking engagement with said lock body;
   a flexible restraining device secured at one end to said lock body and at the opposite end to said "U" shaped member; and
   means securing said "U" shaped member to said lock body for removal only by authorized disengagement therewith;
   wherein said flexible restraining device is of sufficient length to encircle a structure and secure the frame of the bicycle to the structure when said "U" shaped member is secured to said lock body;
   wherein said flexible restraining device is retractable into storage engagement with said lock body when not in use;
   wherein said "U" shaped member is movable into storage engagement with said lock body when not in use thereby securing the opposite end of said restraining device.

2. The combination in accordance with claim 1 wherein said lock body includes at least 2 slots therein positioned to receive the legs of said "U" shaped member when it engages the bicycle wheel and encircles a portion of the frame thereof.

3. The combination in accordance with claim 2 wherein said lock body includes four openings therein positioned to receive the legs of said "U" shaped locking member when it encircles a portion of the wheel and frame of the bicycle and engages the legs of the "U" shaped locking member when it is reversed in a position in which the legs thereof pass to each side of the tire and rim of the wheel and interfere with the movement of the wheel of the bicycle.

4. The combination in accordance with claim 3 in which said lock body includes a lock mechanism for securing said "U" shaped member with respect to said lock body when the legs thereof pass through said slots.

5. The combination in accordance with claim 1 including means for retracting said flexible restraining device for storage by said lock body.

6. The combination in accordance with claim 5 wherein said means for retracting acts to store said flexible restraining device inside said lock body; and
   said "U" shaped member secures said opposite end of said flexible restraining device in the region of entrance of said flexible restraining device into said lock body.

7. The combination in accordance with claim 5 wherein said flexible restraining device is prebiased into a predetermined helical shape and said lock body constitutes a support for said helical shape.

8. The combination in accordance with claim 7 wherein said lock body includes a cavity having a shape corresponding to the helical shape of the flexible restraining device and whereby one end of said flexible restraining device is secured within said cavity and in an unrestrained condition, said flexible restraining device enters said cavity for storage therein.

9. The combination in accordance with claim 7 wherein said lock body includes an elongated portion having an outside maximum dimension corresponding to less than the inside diameter of the helical shape of said flexible restraining device,
   the end of said cable secured to said body being secured in a position whereby unrestrained positioning of said flexible restraining device actually forms a helical coil about said lock body.

10. The combination in accordance with claim 9 wherein said "U" shaped member may be secured to said locked body in stored position and when in said stored position acts to hold the second end of said flexible restraining device into position corresponding to its natural position when stored upon said lock body.

11. The combination in accordance with claim 1 wherein said means for securing said lock to a bicycle frame includes an elongated tubular portion encircling the frame of said bicycle and including securing means within said lock body securing said elongated tubular portion to said lock body; said U-shaped member also adapted to be secured to said lock body in a stored position; and
   the U-shaped member obstructing access to said securing means when either in said stored or locked position.

12. A locking mechanism comprising:
   a lock body which is substantially closed except for two pair of aligned openings therethrough;
   a reentrant shaped member having a pair of generally parallel legs and a bight position;
   said legs dimensioned to extend into said lock body;
   lock means for securing the legs of said reentrant shaped member to said lock body; and
   flexible restraining means of sufficient length to encircle a stationary object, said flexible theft restraining means interconnecting said lock body to said reentrant shaped member;
   including means for securing said lock body to the frame of a wheeled vehicle with said flexible theft restraining device in retractable storage engagement with said lock body and said locking member securable to said lock body in noninterfering position with the operation of said vehicle and movable to an interfering locking position with said flexible theft restraining means in extended theft restraining position around an object.

13. The combination in accordance with claim 12 wherein said securing means is mountable on the frame of a bicycle with said locking member enclosing a section of the tire and rim of a bicycle while in lockable engagement with said lock body.

* * * * *